J. REUTHER.
POTATO DIGGER.
APPLICATION FILED OCT. 22, 1910.
1,008,673.
Patented Nov. 14, 1911.
3 SHEETS—SHEET 1.
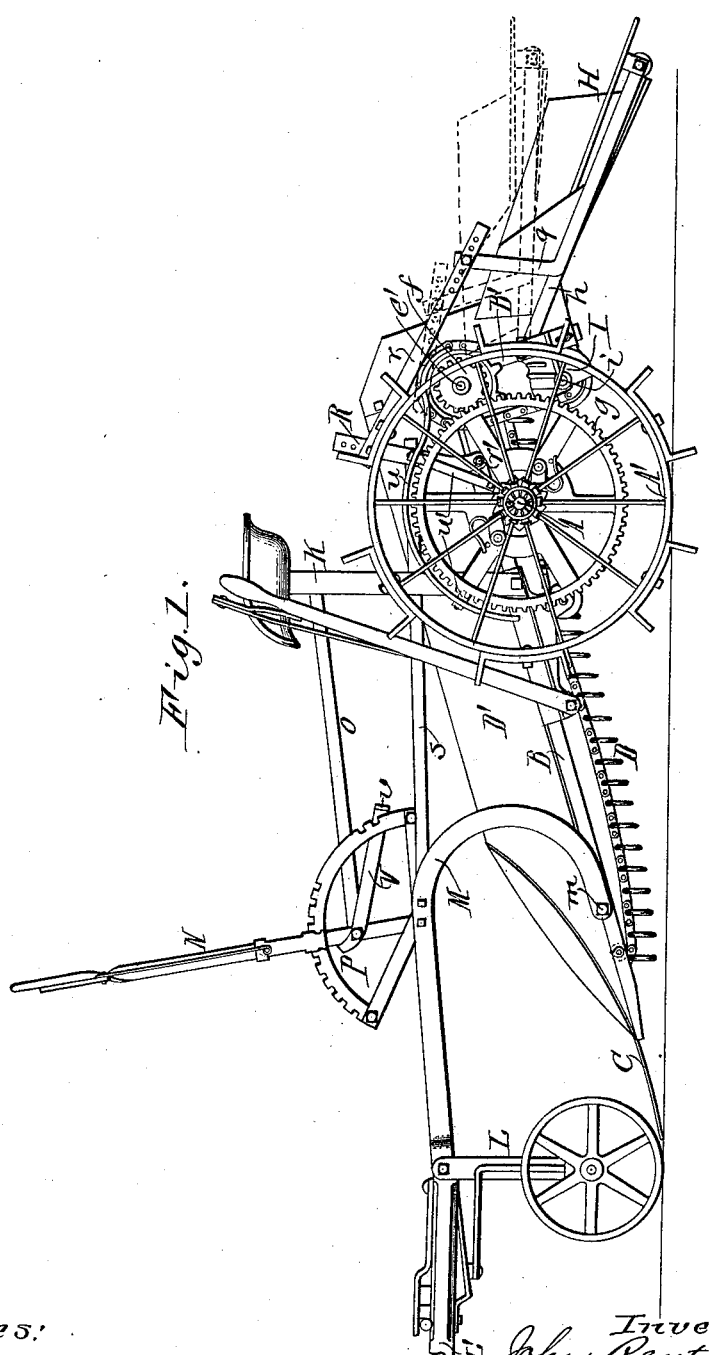
Witnesses:
Richard Sommer
Alfred Borkenhagen.
Inventor
John Reuther,
by Geyer Popp
Attorneys.

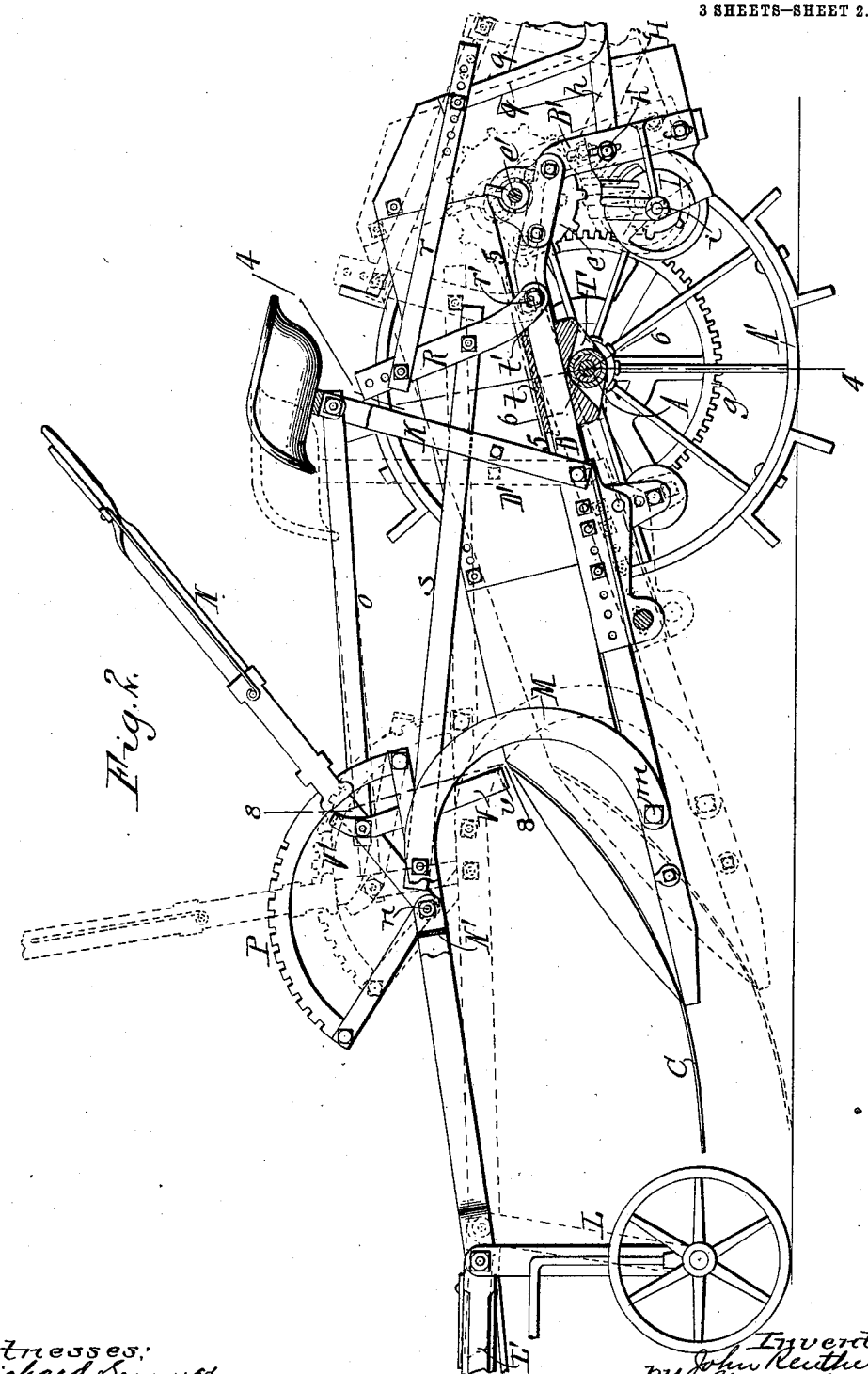

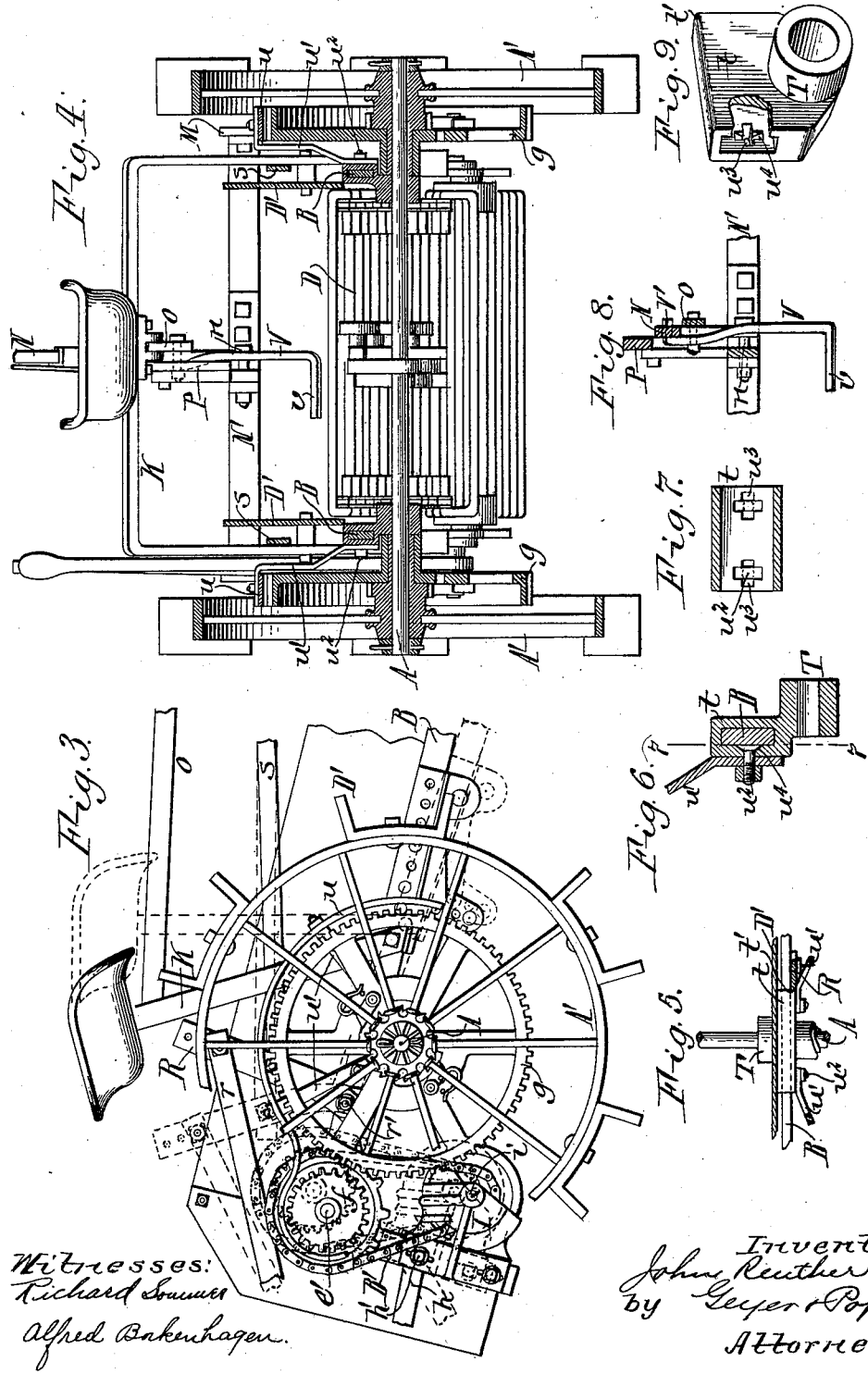

UNITED STATES PATENT OFFICE.

JOHN REUTHER, OF EAST AURORA, NEW YORK.

POTATO-DIGGER.

1,008,673. Specification of Letters Patent. Patented Nov. 14, 1911.

Application filed October 22, 1910. Serial No. 588,437.

*To all whom it may concern:*

Be it known that I, JOHN REUTHER, a citizen of the United States, residing at East Aurora, in the county of Erie and State of New York, have invented new and useful Improvements in Potato-Diggers, of which the following is a specification.

This invention relates more particularly to potato diggers of the class comprising a plow, an elevator or main separator which receives the potatoes, earth and vines from the plow, and a shaker or secondary separator which receives the potatoes and remaining soil and vines from the elevator and effects a final separation. The invention is, however, also applicable to diggers having only a main separator or elevator. Potato diggers of the above type are shown and described in Letters Patent of the United States Nos. 952,946 and 967,557, granted to me March 22, 1910, and August 16, 1910, respectively. In machines of this kind in which the elevator and the shaker remain constantly in gear with the driving axle, they are actuated in turning the machine at the ends of the potato-rows as well as during the digging operation, thus scattering the potatoes into the path of the draft animals where they are liable to be crushed or bruised and also increasing the labor of gathering them. This construction also imposes unnecessary strain and labor upon the draft animals.

The object of my invention is to provide the machine with simple and convenient means for throwing the movable separating devices, that is, the elevator and the shaker out of gear in turning the machine, thus preventing scattering of the potatoes, easing the draft and avoiding uneven or one-sided strain on the machine which takes place in ordinary diggers owing to the fact that in turning the machine the outer ground wheel is practically the sole driver.

In the accompanying drawings consisting of 3 sheets: Figure 1 is a side elevation of a potato digger embodying the invention. Fig. 2 is a fragmentary side elevation thereof, partly in section, on an enlarged scale. Fig. 3 is a fragmentary side elevation of the machine viewed from the side opposite that shown in Fig. 2. Fig. 4 is a transverse section on line 4—4, Fig. 2. Fig. 5 is a section on line 5—5, Fig. 2. Fig. 6 is a transverse section on line 6—6, Fig. 2, omitting the axle. Fig. 7 is a vertical longitudinal section on line 7—7, Fig. 6. Fig. 8 is a transverse section on line 8—8, Fig. 2. Fig. 9 is a perspective view of one of the axle boxes.

Similar letters of reference indicate corresponding parts throughout the several views.

A indicates the main axle of the machine to which the ground wheels $A^1$ are secured in the usual manner. Supported upon the axle is the main frame which in the construction shown, comprises forwardly-inclined side bars B tied together by suitable cross-rods and provided at their rear ends with downward extensions $B^1$.

C indicates the plow or digging blade attached to the front end of the main frame and D the endless elevator or main separator which runs around front guide rollers carried by the main frame and rear sprocket wheels $e$ secured to a transverse shaft $e^1$, as more fully shown in the aforesaid Letters Patent No. 967,557. This shaft is journaled in the main frame and driven from the ground wheels by pinions $f$ and gear wheels $g$.

H indicates the shaker or secondary separator having its head located underneath the delivery end of the elevator D. This shaker may be of any suitable construction and actuated by any appropriate means, but it is preferably pivoted at its front end to the frame of the machine to permit its rear end to be raised in turning the machine and taking it to and from the field. In its preferred construction, its side bars $h$ are pivoted at $h^1$ to the bearing boxes I which carry the actuating shaft $i$ of the shaker, as more fully described and shown in the Letters Patent hereinbefore referred to.

K indicates a seat supporting yoke or frame straddling the elevator and secured to the side bars B of the main frame and the side plates $D^1$ of the elevator.

L indicates the usual truck to which the draft pole $L^1$ is attached, and M indicates the curved longitudinal draft bars pivoted at their front ends to the truck-frame and at their rear ends to the side bars B by bolts $m$.

A hand lever N, arranged in front of the seat in convenient reach of the operator, is pivoted at $n$ to a cross bar $N^1$ secured to the draft bars M. This lever swings lengthwise of the machine and is connected with the seat yoke K by a link $o$, the lever having a suitable catch which interlocks with a notched segment P, as in the aforesaid Letters Patent.

Extending upwardly from the side bars of the shaker are arms $q$ which are connected by links $r$ with levers R pivoted at their lower ends to the side bars B of the main frame preferably on the rear sides of the axle, as shown at $r^1$. Links $s$ connect these levers with the draft bars M. By this construction, upon pulling the hand lever N rearwardly, the main or elevator frame which carries the plow C is raised from the position shown in Fig. 1, to that shown by full lines in Fig. 2, and at the same time the rear end of the shaker is elevated to the position shown by dotted lines in Fig. 1, thus simultaneously lifting the plow and the shaker clear of the ground for turning and transporting the machine. In effecting this movement of the parts, the seat yoke K is tilted backward with the hand lever, and as the yoke is rigidly secured to the elevator frame, the front portion of the latter is elevated. This movement causes the draft bars M to move forward to a certain extent, as well as upward, as appears in Fig. 2. The levers R take part in this forward movement, and as the shaker frame is connected therewith, it is raised in an obvious manner.

It will be noted that a part of the gearing which transmits motion from the ground wheels to the elevator and the shaker is mounted on the ground wheels, for example, the gear wheels $g$, while another part thereof is mounted upon the main frame, for example, the gear pinions $f$. For the purpose of throwing the elevator and shaker, or either of these members into and out of gear with the ground wheels, the main frame is made movable relatively to the ground wheels, so that said pinions may be moved into and out of engagement with said gear wheels; and in order to effect this disconnection simultaneously with the raising of the plow and the shaker, this shifting movement of the frame is preferably accomplished by the lifting mechanism of these members. In the construction shown in the drawings, the side bars B of the main frame are for this purpose mounted to slide in guides or sleeves $t$ carried by the bearing boxes T of the axle, and the levers R are arranged to bear against the rear ends of said sleeves. By this construction, upon pulling the levers R forwardly by means of the hand lever N, they fulcrum upon the upper rear portions or corners $t^1$ of said sleeves. The portions of these levers below said fulcrum thus move rearwardly, shifting the main frame in the same direction sufficiently to throw the pinions $f$ out of gear with the gear wheels $g$, as shown by full lines in Fig. 3, and stopping the elevator and the shaker. During this rearward movement of the main frame, the axle and its boxes remain relatively stationary owing to the resistance of the ground wheels whose traction lugs are embedded in the soil. In order to again throw the elevator and shaker into gear, as shown in Fig. 1 and by dotted lines in Fig. 3, the operator simply unlocks the hand lever N, and allows the draft animals to draw the machine forward, whereupon the main frame is shifted forward to its normal position by the draft exerted through the draft bars M. By thus combining the lifting mechanism of the plow and the shaker with the mechanism for throwing the shaker and the elevator into and out of gear with the ground wheels, both of these operations are effected simultaneously and in a simple and convenient manner. The coupling of these two mechanisms has the further advantage that it is impossible for the operator to throw the parts out of gear without at the same time raising them to a height at which they cannot be injured or broken in turning the machine or transporting it from place to place. While this coupling of the two mechanisms is desirable, I do not wish to limit myself thereto, as the feature of throwing the shaker and the elevator, or either of them, in and out of gear by a shifting movement of the main frame, could be employed independently of the lifting mechanism, for example, by disconnecting the links $r$ from the levers $q$.

It should be noted that in some of the appended claims the terms "separator" and "separating device" are used in a broad sense to cover either the elevator or the shaker.

$u$ indicates guards or shields extending over the gear wheels $g$ and pinions $f$ and carried by arms or brackets $u^1$. These brackets are preferably secured to the sleeves $t$ of the axle-boxes by bolts $u^2$ having T-heads and passing through corresponding slots $u^3$ in the outer walls of the sleeves. These walls are provided on their inner sides with recesses or countersinks $u^4$ which intersect the slots and receive the heads of the bolts, the latter being retained in said recesses by the frame side-bars B, as shown in Fig. 6. In assembling these parts, the T-heads of the bolts are passed through the slots from the outside of the sleeves and then given a quarter turn to engage the recesses $u^4$ after which the sleeves are passed over the side bars B.

To facilitate the rearward movement of the hand lever N, the same preferably carries a foot lever V having a treadle $v$ at its lower end and provided at its upper end with a laterally extending lip $V^1$ which bears against the front side of the hand lever.

I claim as my invention:

1. In a machine of the character described, the combination of the axle, the ground wheels, bearing boxes mounted on the axle and carrying guides, a main frame having longitudinal side bars slidable in said guides, a separator carried by said frame, driving mechanism for the separator including separable members, one mounted to turn with the ground wheels and the other mounted upon said slidable main frame, and means for shifting said frame in said guides lengthwise of the machine.

2. In a machine of the character described, the combination of the axle, the ground wheels, bearing boxes mounted on the axle, a frame supported by said bearing boxes and slidable thereon lengthwise of the machine, a separator carried by said frame, driving mechanism for the separator including separable members, one mounted to turn with the ground wheels and the other mounted upon said slidable frame, and shifting devices mounted on said frame and engaging said bearing boxes.

3. In a machine of the character described, the combination of the axle, the ground wheels, bearing boxes mounted on the axle, a frame supported by said bearing boxes and slidable thereon lengthwise of the machine, a separator carried by said frame, driving mechanism for the separator including separable members, one mounted to turn with the ground wheels and the other mounted upon said slidable frame, and shifting levers pivoted to said frame and arranged to fulcrum against said bearing boxes.

4. In a machine of the character described, the combination of the axle, the ground wheels, bearing boxes mounted on the axle, a frame supported by said bearing boxes and slidable thereon lengthwise of the machine, a separator carried by said frame, driving mechanism for the separator including separable members, one mounted to turn with the ground wheels and the other mounted upon said slidable frame, shifting levers pivoted to said frame on the rear side of the axle and arranged to fulcrum against the rear portions of said bearing boxes, and an operating lever connected with said shifting levers.

5. In a machine of the character described, the combination of the axle, the ground wheels, bearing boxes mounted on the axle and having guide-sleeves, a frame having side bars slidable in said sleeves, a separator carried by said frame, driving mechanism for the separator including separable members, one mounted to turn with the ground wheels and the other mounted upon said slidable frame, and shifting levers pivoted to said frame on the rear side of said bearing boxes and engaging the latter.

6. In a machine of the character described, the combination of the axle, the ground wheels, bearing boxes mounted on the axle, a frame supported by said bearing boxes and slidable thereon lengthwise of the machine, a vertically-movable shaker attached to said frame in rear of the axle, driving mechanism for said shaker including separable gear wheels, one mounted to turn with the ground wheels and the other mounted upon said slidable frame, shifting levers attached to said frame and engaging said bearing boxes, and lifting-connections extending from said levers to the frame of the shaker.

7. In a machine of the character described, the combination of the axle, the ground wheels, bearing boxes mounted thereon and each having a sleeve provided in its side with a slot and on its inner side with a recess intersecting said slot, a main frame shiftable lengthwise of the machine and having side bars slidable in said sleeves, a separator mounted on said frame, driving mechanism for the separator including separable gear wheels, one rotatable with the ground wheels and the other mounted upon said shiftable frame, a shield for said gear wheels, and a fastening bolt for the shield passing through said slot and having a T-head seated in said recess.

Witness my hand this 19th day of October, 1910.

JOHN REUTHER.

Witnesses:
C. F. GEYER,
E. M. GRAHAM.

---

Copies of this patent may be obtained for five cents each, by addressing the "Commissioner of Patents, Washington, D. C."